(No Model.) 2 Sheets—Sheet 2.
I. H. JEWELL.
APPARATUS FOR THE PURIFICATION OF SEWAGE OR OTHER IMPURE LIQUIDS.
No. 506,879. Patented Oct. 17, 1893.
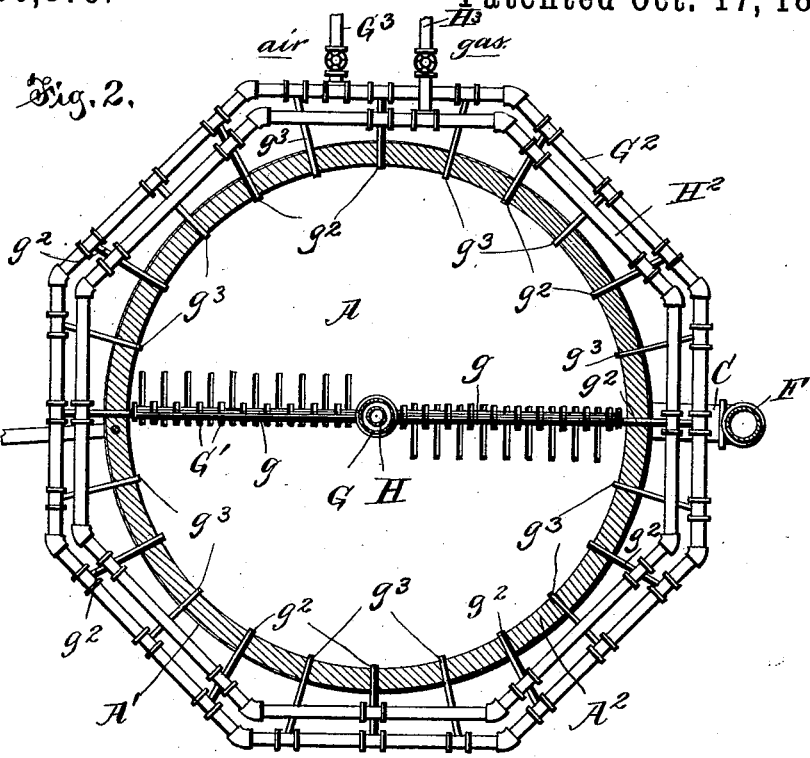
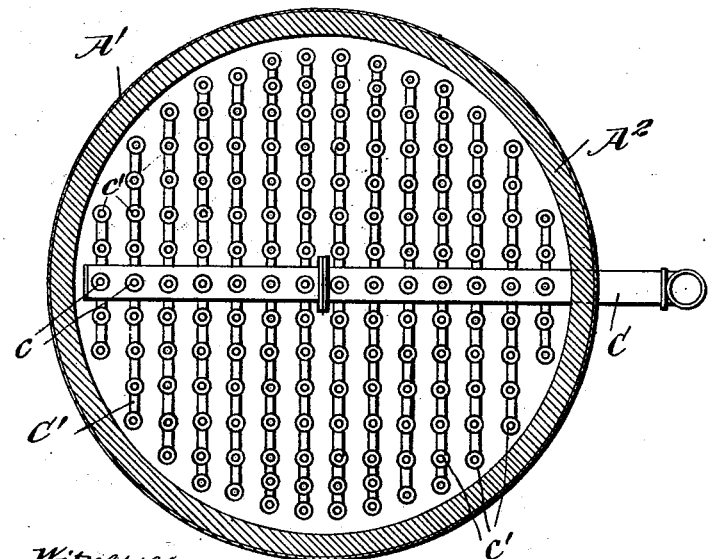
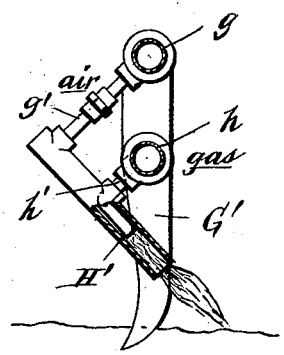
Witnesses
Inventor:
Ira H. Jewell.
By Dayton Poole & Brown
His Attys.

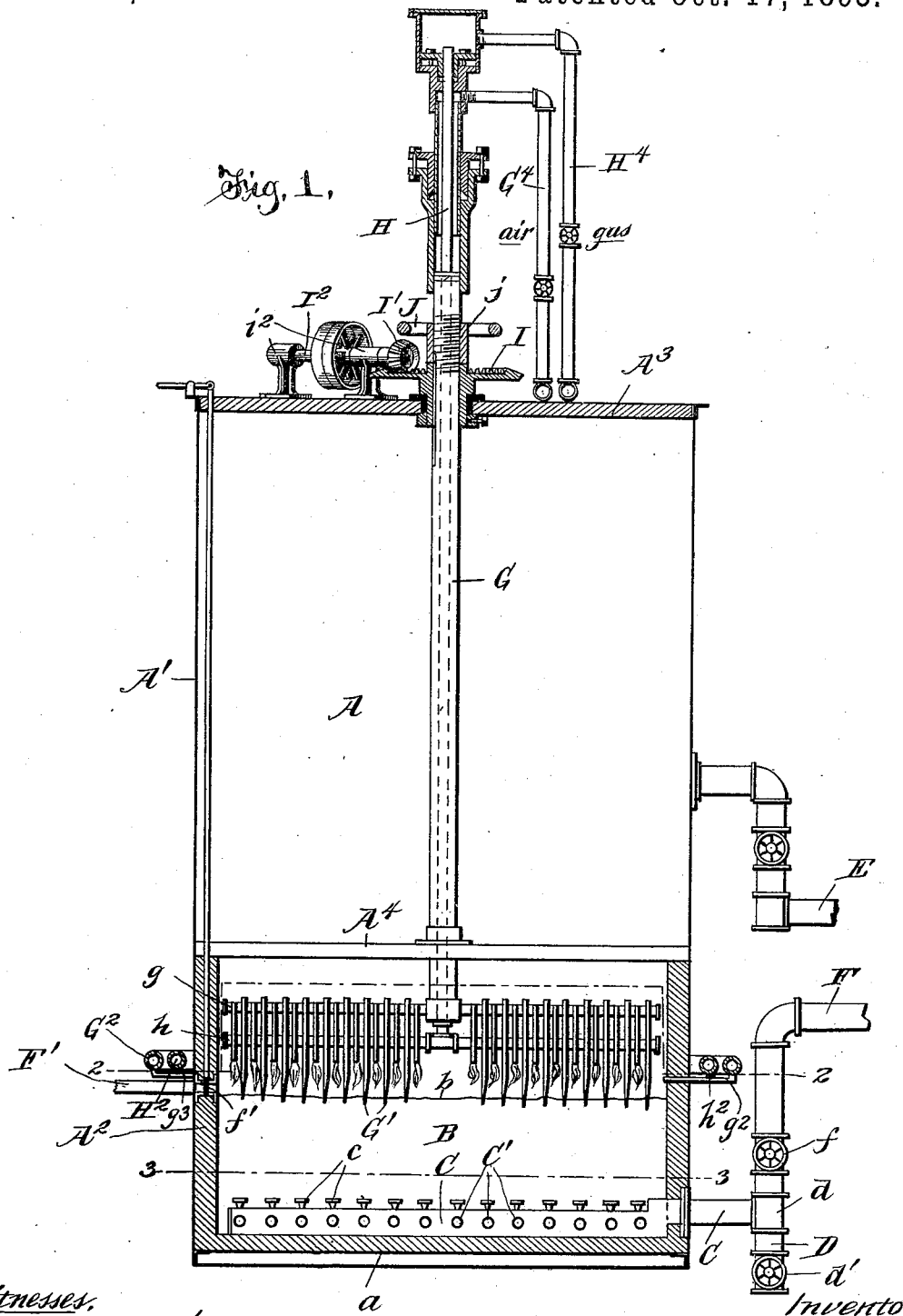

UNITED STATES PATENT OFFICE.

IRA H. JEWELL, OF CHICAGO, ILLINOIS.

APPARATUS FOR THE PURIFICATION OF SEWAGE OR OTHER IMPURE LIQUIDS.

SPECIFICATION forming part of Letters Patent No. 506,879, dated October 17, 1893.

Application filed December 22, 1891. Serial No. 415,845. (No model.)

*To all whom it may concern:*

Be it known that I, IRA H. JEWELL, of Chicago, in the county of Cook and State of Illinois, have invented certain new and useful Improvements in Apparatus for the Purification of Sewage or other Impure Liquids; and I do hereby declare that the following is a full, clear, and exact description thereof, reference being had to the accompanying drawings, and to the letters of reference marked thereon, which form a part of this specification.

This invention relates to an improved apparatus for the purification of sewage and other impure liquids and has for its object the organization and operation of mechanical devices whereby the liquid portions of the sewage are separated from the solid portions thereof by filtration to render said liquid portions fit for subsequent use, and whereby the remaining solid impure portions thus separated from the liquids may be volatilized and consumed.

The invention embraces a receptacle in which the sewage or other impure liquid is treated, devices for agitating the material thus treated or the filter bed of the receptacle, means separating the liquid from the solid particles, and devices designed to effect the volatilization and consumption of the solid particles, substantially as herein shown and more particularly specified in the appended claims.

The accompanying drawings illustrate an apparatus embodying my invention.

Figure 1 is a vertical section of a filtering vessel of known form, modified to embody my improvements. Fig. 2 is a horizontal section of the same taken on line 2—2 of Fig. 1. Fig. 3 is a horizontal section taken on line 3—3 of Fig. 1. Fig. 4 is a detail, on an enlarged scale, of one of the agitating blades and an adjacent burner.

The apparatus thus illustrated consists of a tank or vessel A, a filtering bed B of quartz, sand or any other suitable filtering material, an exit C below the filtering bed, discharge and supply pipes D and E, and a plurality of suitable burners located adjacent to but above the surface of the filter bed through which a suitable heating fluid may be passed for volatilizing and consuming the solid parts of the sewage and the gaseous products arising or emanating therefrom, or separated out by said filter bed.

It also consists of the above mentioned parts in combination with means to effect an agitation of the filter bed and of the material undergoing treatment.

In operation the sewage is fed or pumped into the vessel A through the supply pipe E, and is deposited upon the filter bed B where the solid parts are arrested and the liquid portion percolates through said filter bed and passes from the vessel A into the discharge pipe D practically freed from obnoxious matters and in condition for use mechanically or otherwise. The solid parts which accumulate upon the filter bed are subjected from time to time to blasts of flame from the burners located above the filter bed, and are thereby volatilized and consumed, thus closing the filter bed and relieving it of accumulations which would interfere with its proper operation, at the same time disposing of refuse matter that cannot be profitably used.

The filtering vessel A is constructed of a metal cylinder A' and preferably provided at its lower end with a lining $A^2$ of fire brick or other refractory material which extends some distance above the surface $b$ of the filter bed B and also covers the closed bottom $a$ of the vessel. An exit pipe C passes through the wall A' $A^2$ of the vessel A and extends across the diameter thereof, resting upon the refractory lining $A^2$, said pipe being provided at short intervals with openings fitted with cup-shaped mouths or inlets $c$ provided with screens or sieves to permit of the passage of water to pipe C, but prevent the entrance of filtering material therein. The pipe C is provided with a plurality of branch pipes C' which also have screened inlets $c'$ to permit of the passage of filtered water and convey it into the pipe C from which it flows into a discharge pipe D at the exterior of the filtering vessel A. A supply pipe E opens into the filtering vessel A at a distance above the lining $A^2$ thereof, and a clear water supply pipe F is connected with the exit pipe C and discharge pipe D by a suitable coupling $d$. A valve $f$ is arranged within the pipe F above the coupling $d$, and another valve $d'$ is provided for the discharge pipe D just below said coupling. Owing to this arrangement, on opening the valve $d'$ and closing the valve $f$ the sewage may be forced into the filter through pipe E E', and after passing downward through the filtering bed B will escape through pipes C and D. An escape pipe F' leads from the vessel A at a level with the surface $b$ of the filtering bed B, and this escape pipe is closed by a gate or other suitable valve $f'$. Upon closing the valve $d'$ and opening the valves $f$ and $f'$ a flow of clear water may be directed through pipe F and the exit pipe C, and from thence upward through the filtering bed B and out through the escape pipe F', thus cleansing the filtering bed of particles separated from the sewage water which may not have been acted upon by the flames.

The vessel A is provided with a cover $A^3$ through the center of which is passed a vertical, tubular shaft G, within which is concentrically arranged another shaft H, its lower end projecting slightly below the lower end of the outer tubular shaft G, and is provided with a cross arm $h$ terminating in proximity with the lining $A^2$ of the vessel A. The lower end of the outer tubular shaft G is also provided with an arm $g$ arranged above and parallel with the arm $h$ of the shaft H, and to these arms $g$ and $h$ are secured plows or blades G' the lower ends of which, upon proper adjustment, are designed to penetrate a little distance into the filtering bed B. A strut or bridge $A^4$ is secured within the vessel A near the lower end of shaft G, and is provided with a bearing $a^4$ to support said shaft against lateral strain.

Encircling the vessel or tank A near its base, are two pipes $G^2$ and $H^2$ to which are connected pipes $G^3$ and $H^3$, the one $G^3$ leading from an air forcing apparatus (not shown) and the other $H^3$ leading from any suitable gas supply.

The pipe $H^2$, into which gas is fed from gas pipe $H^3$, is provided with a number of jets or nozzles $h^2$ which project through the wall and lining of tank A into said tank, terminating at a little distance from said lining, and just above the surface of the filter bed. The air pipe $G^2$ is also provided with nozzles $g^2$ which inclose the nozzles $h^2$ of the gas pipe $H^2$, said nozzles $g^2$ and $h^2$ forming in effect a circular series of Bunsen burners each adapted to discharge a jet of flame across the interior of the tank A at a suitable distance above the surface of the filter bed B to volatilize and consume the effete matters deposited upon said filter bed.

To insure an ample supply of air to support combustion within the tank, the air pipe $G^2$ is further fitted with an intermediate series of air nozzles $g^3$ which alternate with the burner nozzles $h^2 g^2$.

The pipes $G^3$ and $H^3$ are provided with valves by which the supply of air and gas supplied to the burners may be regulated or entirely shut off.

The vertical shaft G passes through the hub of a beveled gear wheel I, said hub being elongated or extended and journaled in a bearing secured in the cover $A^3$ of the tank, and this gear wheel I meshes with a beveled pinion I' mounted on the end of a shaft $I^2$ which is journaled in brackets $i^2$ secured to the cover $A^3$ of the tank A, and may be driven by a belt actuated from a conveniently located motor. The vertical shaft G is keyed to, and rotates with, the gear wheel I, and to provide for the vertical adjustment of said shaft so that the blades or plows may be operated in various horizontal planes, I form a longitudinal groove in the surface of the shaft, within which groove is seated a key or spline projecting from the interior of the hub of wheel I. The upper end of the shaft G is threaded exteriorly to engage the internally threaded hub $j$ of a hand wheel J. The lower end of this hub $j$ rests upon the upper end of the hub of the gear wheel I, so that on turning the hand wheel J in one direction or the other the shaft G is raised or lowered through the hub of wheel I without disturbing the driving connection between said shaft and wheel.

As an auxiliary to the agitator plows G', I contemplate providing the cross arms $h g$ with burners which may be used in conjunction with, or in lieu of the circular series of burners heretofore described. To this end the cross arms $g$ and $h$ are made tubular and are provided at points between the plows G' with bosses threaded to receive the threaded ends of short connecting tubes $g'$ and $h'$, the outer ends of which are threaded into the inner and outer tubes forming the burners H'. The connecting tubes $g'$ $h'$ are preferably provided at their opposite ends with right and left hand threads to facilitate the attachment of the burners H' with the tubular arms $g$ and $h$ of the vertical shafts G and H, though it will be understood that this is not essential. The upper end of the outer tubular shaft G is connected by a swivel joint or coupling to an air supply pipe $G^4$ leading from an air-forcing apparatus, and the inner shaft H is also provided at its upper end, which projects above the top of the tube G, with a swivel coupling to which is connected a pipe $H^4$ leading from any suitable source of gas supply. These pipes $G^4$ and $H^4$ are provided with valves by which the supply of gas and air can be regulated, or entirely cut off. It will be understood, of course, that the air pipes $G^2$ and $G^4$ may be connected with and supplied from the same air-forcing apparatus, and that the gas pipes $H^2$ and $H^4$ may be connected with the same gas supply.

While I have described my invention in connection with sewage only, I do not wish it to be understood as solely applicable thereto, for refuse mill water, river or other impure water supplies may be treated in like manner.

I make no claims herein to the method of treating sewage and other impure liquids by filtration to separate the solid from the liquid portions thereof and then volatilizing the impurities recovered, as I have filed another application covering such method as a division of this application.

What I claim is—

1. An apparatus for treating sewage comprising an inclosure having water tight side walls and a filter bed, the space above the filter bed being provided with burners and constituting a combustion chamber, whereby the liquid and solid constituents of sewage may be separated within said inclosure and said solids may be volatilized or consumed without removal therefrom, substantially as described.

2. An apparatus for treating sewage comprising an inclosure having water tight side walls and a filter bed, the space above the filter bed being provided with burners and constituting a combustion chamber, and means within said combustion chamber for agitating the surface of the filter bed, whereby the liquid and solid constituents of sewage may be separated within said inclosure and said solids may be volatilized or consumed without removal therefrom, substantially as described.

3. An apparatus for the purpose described, comprising a tank, a filter located therein, an adjustable agitator suspended above and adapted to agitate the surface of said filter, a plurality of burners arranged in proximity to the filter, each burner being connected with air and gas supply pipes, and a plurality of air nozzles connected with said air supply pipes and terminating within the tank in proximity to but above the surface of the filter, substantially as described.

4. The herein described apparatus for treating sewage, comprising a tank, an agitator suspended therein embracing a vertical shaft provided at its lower end with horizontal arms provided with plows or blades, burners attached to said horizontal arms and each connected with air and gas supply pipes, and means for rotating the vertical shaft, substantially as described.

5. The herein described apparatus for treating sewage, comprising a tank, a filter located therein, an agitator suspended above the filter consisting of two vertical, tubular shafts one within the other and connected respectively with air and gas supply pipes, tubular, horizontal arms connected to the lower end of each of said shafts, plows or blades supported by said arms, a plurality of burners each connected with an arm of the inner and outer shafts by tubular connections, and means for rotating said tubular shafts, substantially as described.

In testimony that I claim the foregoing as my invention I affix my signature in presence of two witnesses.

IRA H. JEWELL.

Witnesses:
TAYLOR E. BROWN,
GEORGE W. HIGGINS, Jr.